(12) United States Patent
Yoon et al.

(10) Patent No.: US 11,847,209 B2
(45) Date of Patent: Dec. 19, 2023

(54) MEMORY DEVICE AND SYSTEM

(71) Applicant: SAMSUNG ELECTRONICS CO., LTD., Suwon-si (KR)

(72) Inventors: Joong Chul Yoon, Seoul (KR); Gi Jin Kang, Seoul (KR); Jae Keun Oh, Seoul (KR)

(73) Assignee: Samsung Electronics Co., Ltd.

( * ) Notice: Subject to any disclaimer, the term of this patent is extended or adjusted under 35 U.S.C. 154(b) by 883 days.

(21) Appl. No.: 16/667,582

(22) Filed: Oct. 29, 2019

(65) Prior Publication Data

US 2020/0265137 A1 Aug. 20, 2020

(30) Foreign Application Priority Data

Feb. 18, 2019 (KR) .................. 10-2019-0018418

(51) Int. Cl.
| | |
|---|---|
| *G06F 21/00* | (2013.01) |
| *G06F 21/55* | (2013.01) |
| *G06F 12/06* | (2006.01) |
| *G06F 11/10* | (2006.01) |
| *G06F 21/60* | (2013.01) |
| *G06F 12/1009* | (2016.01) |

(52) U.S. Cl.
CPC ........ *G06F 21/554* (2013.01); *G06F 11/1068* (2013.01); *G06F 12/0646* (2013.01); *G06F 12/1009* (2013.01); *G06F 21/60* (2013.01); *G06F 2212/1052* (2013.01); *G06F 2212/657* (2013.01); *G06F 2221/034* (2013.01)

(58) Field of Classification Search
CPC ......... G06F 2221/034; G06F 2212/657; G06F 2212/1052; G06F 21/60; G06F 12/1009; G06F 12/0646; G06F 11/1068; G06F 21/554
USPC .......................................................... 726/23
See application file for complete search history.

(56) References Cited

U.S. PATENT DOCUMENTS

| | | | |
|---|---|---|---|
| 4,916,626 A * | 4/1990 | Vermesse ......... | G07B 17/00193 |
| | | | 705/401 |
| 7,813,175 B2 | 10/2010 | Kim | |
| 7,821,841 B2 | 10/2010 | Kim | |
| 7,907,447 B2 * | 3/2011 | Tao .................. | G11C 16/22 |
| | | | 365/185.11 |
| 8,230,234 B2 | 7/2012 | Yoon et al. | |
| 8,254,169 B2 | 8/2012 | Kim | |
| 9,269,418 B2 | 2/2016 | Felton et al. | |

(Continued)

FOREIGN PATENT DOCUMENTS

JP       2010-198252 A       9/2010

*Primary Examiner* — Josnel Jeudy
(74) *Attorney, Agent, or Firm* — Fish & Richardson P.C.

(57) ABSTRACT

A memory device includes an address generator which generates a first physical address and a second physical address different from the first physical address. A first nonvolatile memory includes the first physical address, and a second nonvolatile memory includes the second physical address. An attack detecting circuit detects whether the first and second nonvolatile memories are attacked. The attack detecting circuit receives first data from the first nonvolatile memory and receives second data from the second nonvolatile memory, compares the first data and the second data with each other, and determines whether the first and second nonvolatile memories are attacked on the basis of a comparison result of the first data and the second data.

12 Claims, 15 Drawing Sheets

(56) References Cited

U.S. PATENT DOCUMENTS

| | | | |
|---|---|---|---|
| 9,558,375 B2 | 1/2017 | Liardet et al. | |
| 9,921,969 B2 | 3/2018 | Gunnam | |
| 2003/0200478 A1* | 10/2003 | Anderson | H04L 1/22 |
| | | | 714/E11.034 |
| 2009/0088923 A1* | 4/2009 | Ban | G07C 5/085 |
| | | | 701/29.1 |
| 2009/0113546 A1 | 4/2009 | Kim et al. | |
| 2009/0254777 A1* | 10/2009 | Feyt | G11C 16/349 |
| | | | 714/E11.178 |
| 2016/0132388 A1* | 5/2016 | Kim | G11C 29/52 |
| | | | 714/764 |
| 2017/0277432 A1 | 9/2017 | Yun et al. | |
| 2017/0293575 A1* | 10/2017 | Best | G11C 13/0059 |
| 2019/0303239 A1* | 10/2019 | Hsiao | G06F 12/0246 |
| 2020/0105354 A1* | 4/2020 | Helmick | G11C 16/3495 |

* cited by examiner

MEMORY DEVICE AND SYSTEM

CROSS-REFERENCE TO RELATED APPLICATION

This application claims priority to Korean Patent Application No. 10-2019-0018418, filed on Feb. 18, 2019 in the Korean Intellectual Property Office, the disclosure of which is incorporated by reference herein in its entirety.

BACKGROUND

1. Technical Field

The present disclosure relates to a memory device and system. More specifically, the present disclosure relates to a memory device and system with an enhanced security function for preventing the leakage of data to outside or preventing a change in program code.

2. Description of the Related Art

With the development of technology, the memory device and system are used in various fields. However, data requiring high security, such as personal information, needs to be stored in a memory device with enhanced security functions.

A security memory device, such as a smart card, may process data that requires security, such as a cryptographic key, sensitive data and sensitive code, and errors may occur in the data requiring the security, due to external attacks or problems with the security memory device. For example, data stored in the security memory device may leak by a fault attack in which an error is repeatedly injected using a laser or an X-ray or the program code or the like changes, which may cause a big problem.

SUMMARY

Aspects of the present disclosure provide a memory device with an enhanced security function.

Aspects of the present disclosure also provide a memory system with an enhanced security function.

According to some aspects of the present disclosure, a memory device includes: an address generator which generates a first physical address and a second physical address different from the first physical address, a first nonvolatile memory including the first physical address, a second nonvolatile memory including the second physical address, and an attack detecting circuit which detects whether the first and second nonvolatile memories are attacked. The attack detecting circuit receives first data from the first nonvolatile memory, receives second data from the second nonvolatile memory, compares the first data and the second data with each other, and determines whether the first and second nonvolatile memories are attacked on the basis of a comparison result of the first data and the second data.

According to some aspects of the present disclosure, a memory device includes first and second nonvolatile memories. A processor receives an identifier, first data associated with the identifier, and a write request for the first data. The processor generates a first logical address, using the identifier. An address generator generates a first physical address corresponding to the first logical address and a second physical address corresponding to the first logical address and different from the first physical address. In response to a write request for the first data, the processor stores the first data at the first physical address of the first nonvolatile memory and stores the first data at the second physical address of the second nonvolatile memory.

According to some aspects of the present disclosure, a memory device includes: (1) a first nonvolatile memory which stores first data at a first physical address corresponding to a first identifier and (2) a second nonvolatile memory in which second data different from the first data is stored at a second physical address corresponding to the first identifier and different from the first physical address. An attack detecting circuit detects whether the first and second nonvolatile memories are attacked. A processor receives a read request of data corresponding to the first identifier. In response to the read request, the processor accesses the first physical address of the first nonvolatile memory to read third data associated with the first data and accesses the second physical address of the second nonvolatile memory to read fourth data associated with the second data. The attack detecting circuit receives the third and fourth data and determines whether the first and second nonvolatile memories are attacked on the basis of the third and fourth data.

According to some aspects of the present disclosure, a memory system includes a host and a memory device. The memory device includes first and second nonvolatile memories. In response to a read request for data received from the host, the memory device compares first data stored at a first physical address of the first nonvolatile memory with second data stored at a second physical address of the second nonvolatile memory. The memory device determines whether the first and second nonvolatile memories are attacked on the basis of a comparison result of the first data and the second data. The first physical address and the second physical address are different from each other.

According to an aspect of the present disclosure, a memory device includes a nonvolatile memory that stores data and a nonvolatile memory controller that controls read, write, and erase operations of the nonvolatile memory. A processor, in response to receiving a read request and an address identifier from a host disposed external to the memory device, instructs the nonvolatile memory controller to determine whether first data stored in a first physical address, associated with the address identifier, of the nonvolatile memory corresponds to second data stored in a second physical address, associated with the address identifier, of the nonvolatile memory. And in response to determining the first data does not correspond to the second data, the processor refrains from providing information represented by each of the first data and the second data to the host. The first physical address differs from and does not overlap the second physical address.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the disclosure will become more apparent by describing in detail exemplary embodiments thereof with reference to the attached drawings.

DETAILED DESCRIPTION OF THE EMBODIMENTS

Figure 1:
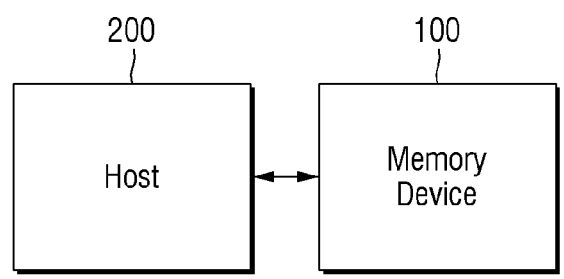
FIG. 1 is an exemplary diagram for explaining a memory system according to some embodiments.

FIG. 1 is an exemplary diagram for explaining a memory system according to some embodiments.

Referring to FIG. 1, the memory system according to some embodiments may include a host 200 and a memory device 100. The memory system according to some embodiments may be implemented as a personal computer (PC), a workstation, a data center, an internet data center (IDC), a storage region network (SAN), and a network attached storage (NAS) or on a mobile computing device, but the embodiments are not limited thereto.

The mobile computing device may be implemented as a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, a credit card system, a radio frequency identification (RFID) device, an e-book device or the like, but the embodiments are not limited thereto.

Figure 2:
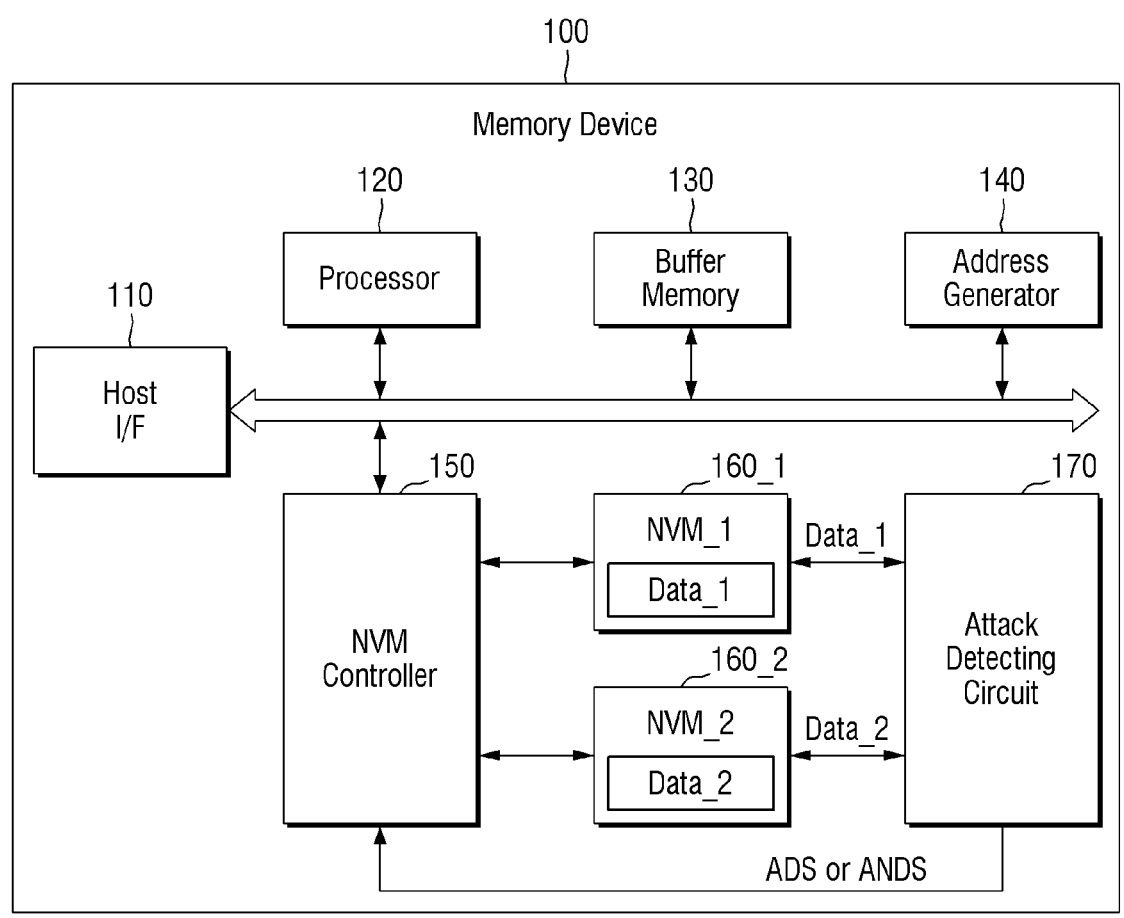
FIG. 2 is an exemplary diagram for explaining the memory device according to some embodiments.

The host 200 may be connected to the memory device 100. The host 200 may request the memory device 100 to process data. For example, the host 200 may request the memory device 100 to perform a read operation, a write operation, an erase operation, or an update operation of data. The memory device 100 may perform operations corresponding to the request of the host 200, and data may be exchanged between the host 200 and the memory device 100. For example, when a data write is required in the memory device 100, the host 200 may provide the data to be written and an identifier associated with the data to be written, together with the data write request, to the memory device 100. The memory device 100 may determine a position at which the data is written on the basis of the identifier and may store the data in that position. In another example, when it is necessary to read data stored in the memory device 100, the host 200 provides an identifier associated with the data to be read together with the data read request to the memory device 100. The memory device 100 may respond to the data read request of the host 200 by: (1) determining the position at which the data to be read is stored on the basis of the received identifier, (2) reading the data from that location, and (3) providing the data to the host 200. Reference is made to FIG. 2 for a specific description of the memory device 100, FIG. 2 is an exemplary diagram for explaining the memory device according to some embodiments.

Referring to FIG. 2, the memory device 100 according to some embodiments may include a host interface 110, a processor 120, a buffer memory 130, an address generator 140, a nonvolatile memory controller 150, a first nonvolatile memory 160_1, a second nonvolatile memory 160_2, and an attack detecting circuit 170.

The host interface 110 may include a protocol for performing the data exchange between the host 200 and the memory device 100. For example, the host interface 110 may communicate with the host 200 via at least one of wireless protocols, such as a universal serial bus (USB) protocol, a multimedia card (MMC) protocol, a peripheral component interconnection (PCI) protocol, a PCI-E (PCI-express) protocol, an advanced technology attachment (ATA) protocol, a Serial-ATA protocol, a Parallel-ATA protocol, a small computer small interface (SCSI) protocol, an enhanced small disk interface (ESDI) protocol, a nonvolatile memory express (NVMe) protocol, an integrated drive electronics (IDE) protocol and a radio frequency identification (RFID) protocol. However, the embodiments are not limited thereto, and the host interface 110 may communicate with the host 200 using various protocols in addition to the above-mentioned protocol. In other words, the host interface 110 may perform the function of providing a path through which data, a request, or a response is exchanged between the host 200 and the memory device 100.

The processor 120 may execute program code for controlling the memory device 100. For example, the processor 120 may execute program code for performing a data write operation or a data read operation in accordance with the request from the host 200.

Figure 3:
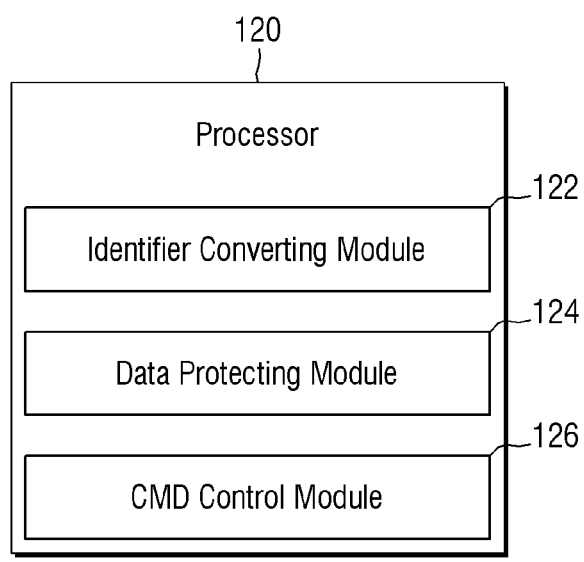
FIG. 3 is an exemplary diagram for illustrating a processor according to some embodiments.

The processor 120 according to some embodiments may include a central processing unit (CPU), a graphic processing unit (GPU), an application processor (AP), a micro processor unit (MPU), and the like, but the embodiments are not limited thereto. Reference is made to FIG. 3 for an additional description of the processor 120.

FIG. 3 is an exemplary diagram for illustrating a processor according to some embodiments.

Referring to FIG. 3, the processor 120 may include an identifier converting module 122, a data protecting module 124 and a command (CMD) control module 126.

The identifier converting module 122 may generate a first logical address LA, using an identifier received from the host 200. According to some embodiments, when the identifier includes the logical address information, the identifier converting module 122 may output the logical address information included in the identifier as the first logical address LA. According to some other embodiments, when the identifier does not include logical address information, the identifier converting module 122 may output a predetermined logical address corresponding to the identifier as the first logical address LA.

For example, if the identifier received from the host 200 includes the logical address "0001", the identifier converting module 122 may output "0001" as the first logical address LA. In another example, when the identifier received from the host 200 means "password", the identifier converting module 122 may output "0010" which is a predetermined logical address corresponding to "password", as the first logical address LA. Even though the logical address has been described as 4-bit data, this is merely an exemplary description, and the embodiments are not limited thereto. The logical addresses may be implemented in various sizes, such as 16 bits, 64 bits, and 256 bits.

The data protecting module 124 may perform a data protection operation of the first nonvolatile memory 160_1 and the second nonvolatile memory 160_2. According to some embodiments, when an attack detecting signal (ADS) is generated from the attack detecting circuit 170, the data protecting module 124 may perform the data protection operation of the first nonvolatile memory 160_1 and the second nonvolatile memory 160_2. The data protection operation of the data protecting module 124 may include prevention of the external leakage of data by deleting first data Data_1 and second data Data_2 stored in the first nonvolatile memory 160_1 and the second nonvolatile memory 160_2 or prevention of the external leakage of data by not responding to the data read request from the host 200.

The command control module 126 may provide data processing commands to the nonvolatile memory controller 150 in response to the external request. For example, the command control module 126 may provide the data write command to the nonvolatile memory controller 150 in response to the data write request from the host 200. In another example, the command control module 126 may provide the data read command to the nonvolatile memory controller 150 in response to the data read request from the host 200. However, the embodiments are not limited to the operation described above and the command control module 126 may provide commands for performing various operations (for example, a background operation, an erase operation, etc.) to the nonvolatile memory controller 150.

Referring to FIG. 2 again, the buffer memory 130 may be a memory that temporarily stores data. For example, the processor 120 may temporarily store data received from the host 200 in the buffer memory 130, in response to the data write request from the host 200. In another example, the processor 120 may temporarily store the data read from the first nonvolatile memory 160_1 and the second nonvolatile memory 160_2 in the buffer memory 130, in response to the data read request from the host 200. The buffer memory 130 according to some embodiments may be implemented as a static random-access memory (SRAM), a fast-SRAM, and/or dynamic RAM (DRAM) and the like, but the embodiments are not limited thereto. In some drawings, the buffer memory 130 is illustrated as being implemented as an independent constituent element, but the embodiments are not limited thereto. For example, the buffer memory 130 may also be included in the processor 120 and may also be included in the nonvolatile memory controller 150.

Figure 4:
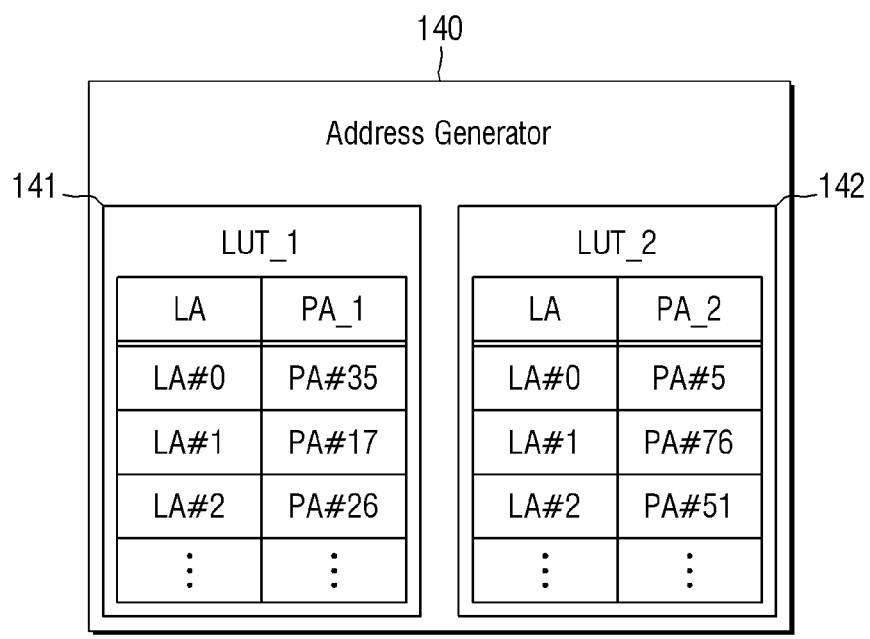
FIGS. 4 and 5 are exemplary diagrams for explaining an address generator according to some embodiments.
Figure 5:
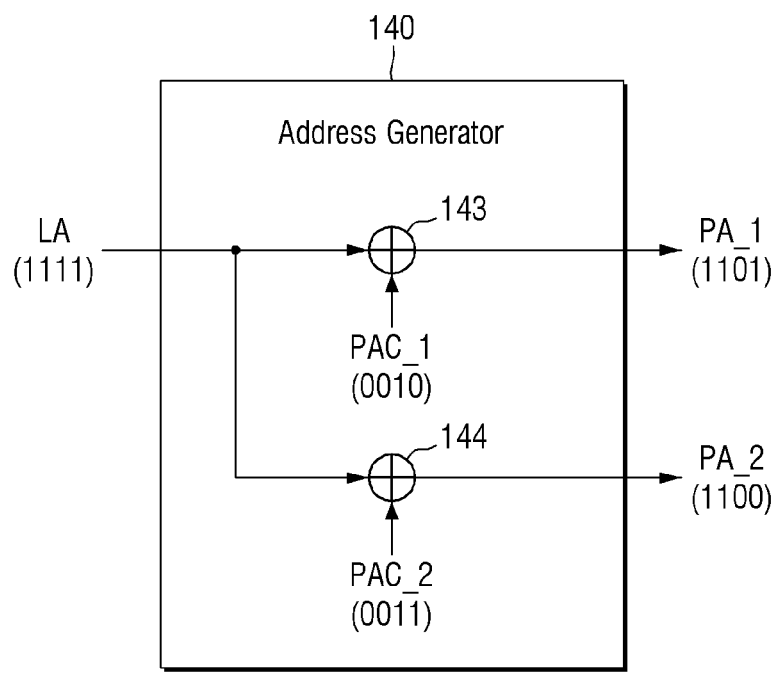

The address generator 140 may generate a first physical address PA_1 and a second physical address PA_2, using the first logical address LA generated by the processor 120. Hereinafter, for the convenience of description, the physical address of the first nonvolatile memory 160_1 is defined as a first physical address PA_1 and the physical address of the second nonvolatile memory 160_2 is defined as the second physical address PA_2. A physical location of the first physical address PA_1 and a physical location of the second physical address PA_2 are different from each other. In other words, the first physical address PA_1 and the second physical address PA_2 are physical addresses different from each other. Reference is made to FIGS. 4 and 5 for an exemplary illustration of the address generator 140.

FIGS. 4 and 5 are exemplary diagrams for explaining an address generator according to some embodiments.

First, referring to FIG. 4, an address generator 140 according to some embodiments may include a first lookup table 141 and a second lookup table 142. The first lookup table 141 may be associated with the first nonvolatile memory 160_1. In other words, the first lookup table 141 may include a correspondence between the first logical address LA and the first physical address PA_1 of the first nonvolatile memory 160_1. Similarly, the second lookup table 142 may be associated with the second nonvolatile memory 160_2. In other words, the second lookup table 142 may include a correspondence between the first logical address LA and the second physical address PA_2 of the second nonvolatile memory 160_2.

According to some embodiments, the first logical address LA and the first physical address PA_1 may be randomly matched, and the first logical address LA and the second physical address PA_2 may be randomly matched. For example, the address generator 140 generates a random number to generate the first physical address PA_1 and the second physical address PA_2 and may match each of the first physical address PA_1 and the second physical address PA_2 with the first logical address LA to generate the first lookup table 141 and the second lookup table 142.

According to some embodiments, the processor 120 may convert the received identifier into the first logical address LA and provide the first logical address LA to the address generator 140. The address generator 140 may generate the first physical address PA_1 and the second physical address PA_2 using the received first logical address LA, the first lookup table 141, and the second lookup table 142. For example, when receiving LA #0 which is the first logical address LA from the processor 120, the address generator 140 may determine the first physical address PA_1 of the first nonvolatile memory 160_1 as PA #35, by referring to the first lookup table 141. Also, when receiving LA #0 which is the first logical address LA from the processor 120, the address generator 140 may determine the second physical address PA_2 of the second nonvolatile memory 160_2 as PA #5, by referring to the second lookup table 142. However, it is a matter of course that the description is only an example, and the embodiments are not limited thereto. As may be confirmed in the above example, the first physical address PA_1 and the second physical address PA_2 are different addresses from each other.

Referring to FIG. 5, the address generator 140 according to some embodiments may include a first address operator 143 and a second address operator 144. The first address operator 143 may receive provision of the first logical address LA and a predetermined first physical address generation code PAC_1. Similarly, the second address operator 144 may receive provision of the first logical address LA and a predetermined second physical address generation code PAC_2. The first physical address generation code PAC_1 and the second physical address generation code PAC_2 may be different from each other.

For example, a case in which the address generator 140 receives the first logical address LA, which is "1111", from the processor 120 will be assumed. At this time, the description will be provided on the assumption that the first physical address generation code PAC_1 is "0010" and the second physical address generation code PAC_2 is "0011". Further, the first address operator 143 and the second address operator 144 will be assumed to be XOR operators. These examples are for the convenience of the description and may be implemented in various ways by a person having ordinary skill in the art of the present disclosure.

"1111" which is the first logical address LA may be input to the first address operator 143. At this time, the first address operator 143 performs the XOR operation of "1111", and "0010" which is a predetermined first physical address generation code PAC_1. The output of the first address operator 143 may be "1101". That is to say, the first physical address PA_1 generated by the address generator 140 may be "1101". Similarly, "1111" which is the first logical address LA may also be input to the second address operator 144. At this time, the second address operator 144 performs the XOR operation of "1111", and "0011" which is a predetermined second physical address generation code PAC_2. The output of the second address operator may be "1100". That is to say, the second physical address PA_2 generated by the address generator 140 may be "1100". That is, as described above, the first physical address PA_1 and the second physical address PA_2 generated by the address generator 140 may be different from each other.

Referring again to FIG. 2, the nonvolatile memory controller 150 may be configured to provide an interface between the first nonvolatile memory 160_1 and the second nonvolatile memory 160_2, the host interface 110, the processor 120, the buffer memory 130 and the address generator 140. Also, the nonvolatile memory controller 150 may be configured to drive firmware for controlling the first nonvolatile memory 160_1 and the second nonvolatile memory 160_2. For example, the nonvolatile memory controller 150 may provide a chip enable signal, a write enable signal, a read enable signal, and the like to the first nonvolatile memory 160_1 and the second nonvolatile memory 160_2. The nonvolatile memory controller 150 may control the input and output of data to and from the first nonvolatile memory 160_1 and the second nonvolatile memory 160_2, in accordance with various commands (e.g., a write command, a read command, etc.) from the processor 120. Even though the drawings illustrate that the processor 120 and the nonvolatile memory controller 150 are divided from each other, the embodiments are not limited thereto. For example, in some other embodiments, the nonvolatile memory controller 150 may be omitted and the processor 120 may perform the operations of nonvolatile memory controller 150 described above.

First data Data_1 may be stored in the first physical address PA_1 of the first nonvolatile memory 160_1. Also, second data Data_2 may be stored in the second physical address PA_2 of the second nonvolatile memory 160_2. The first data Data_1 and the second data Data_2 may be provided to the attack detecting circuit 170 in accordance with the control of the nonvolatile memory controller 150.

The first nonvolatile memory 160_1 and the second nonvolatile memory 160_2 may be the same type of nonvolatile memory or may be different types of nonvolatile memory from each other. The first nonvolatile memory 160_1 and the second nonvolatile memory 160_2 may include a flash memory, a resistive RAM (RRAM), a phase change memory (PRAM), a magnetoresistive memory (MRAM), a ferroelectric memory (FRAM), a spin injection magnetization reversal memory (Spin STT-RAM), and the like, but the embodiments are not limited to these examples.

Although the first nonvolatile memory 160_1 and the second nonvolatile memory 160_2 are illustrated as being separated from each other in some drawings, the embodiments are not limited thereto. According to some embodiments, the first nonvolatile memory 160_1 and the second nonvolatile memory 160_2 may mean different regions of the same memory. For example, the first nonvolatile memory 160_1 is a single level cell (SLC) region of a flash memory and the second nonvolatile memory 160_2 may be a multi-level cell (MLC) region of the same flash memory. A person having ordinary skill in the art of the present disclosure may properly implement the first nonvolatile memory 160_1 and the second nonvolatile memory 160_2 using various methods and policies.

Also, although the memory device 100 according to some embodiments has been illustrated to include two nonvolatile memories, examples are not limited thereto. For example, the memory device 100 according to some embodiments may include three or more nonvolatile memories.

Although not illustrated in the drawings, the nonvolatile memory controller 150, the first nonvolatile memory 160_1 and/or the second nonvolatile memory 160_2 according to some embodiments may be mounted, using packages such as a Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline Integrated Circuit (SOIC), Shrink Small Outline Package (SSOP), Thin Small Outline (TSOP), System In Package (SIP), Multi Chip Package (MCP), Wafer-level Fabricated Package (WFP), and Wafer-level Processed Stack Package (WSP), but the embodiments are not limited thereto.

The nonvolatile memory controller 150, the first nonvolatile memory 160_1, and the second nonvolatile memory 160_2 may be integrated into one semiconductor device. For example, the nonvolatile memory controller 150, the first nonvolatile memory 160_1, and the second nonvolatile memory 160_2 may be integrated into one semiconductor device to constitute a memory card. For example, the nonvolatile memory controller 150, the first nonvolatile memory 160_1, and the second nonvolatile memory 160_2 may be integrated into one semiconductor device to constitute a memory card, such as a PC card (PCMCIA, personal computer memory card international association), a compact flash card (CF), a smart media card (SM, SMC), a smart card, a memory stick, a multimedia card (MMC, RS-MMC, and MMCmicro), an SD Card (SD, miniSD, microSD, and SDHC), and an universal flash storage (UFS)

Figure 6:
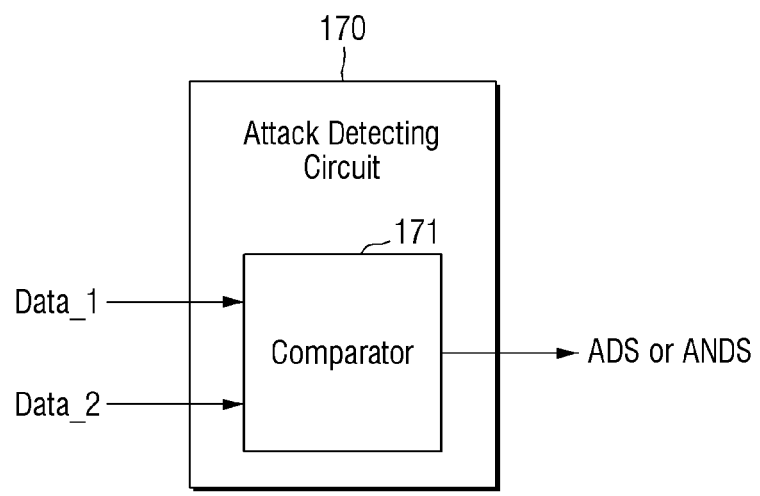
FIG. 6 is an exemplary diagram for explaining an attack detecting circuit according to some embodiments.

The attack detecting circuit 170 may detect whether the first nonvolatile memory 160_1 and the second nonvolatile memory 160_2 are attacked, using the first data Data_1 received from the first nonvolatile memory 160_1 and the second data Data_2 received from the second nonvolatile memory 160_2. The attack detecting circuit 170 may generate either an attack detecting signal (ADS) or an attack non-detecting signal (ANDS) in accordance with the detection result. Reference is made to FIG. 6 for an exemplary illustration.

FIG. 6 is an exemplary diagram for explaining the attack detecting circuit according to some embodiments.

Referring to FIG. 6, the attack detecting circuit 170 may include a comparator 171. The first nonvolatile memory 160_1 may provide the first data Data_1 stored in the first physical address PA_1 to the comparator 171 of the attack detecting circuit 170. Similarly, the second nonvolatile memory 160_2 may provide the second data Data_2 stored in the second physical address PA_2 to the comparator 171 of the attack detecting circuit 170.

The comparator 171 compares the received first data Data_1 with the second data Data_2 and may generate one of the attack detecting signal (ADS) and the attack non-detecting signal (ANDS) on the basis of the comparison result. According to some embodiments, if the first data Data_1 and the second data Data_2 are different from each other, the comparator 171 may generate the attack detecting signal (ADS). On the other hand, if the first data Data_1 and the second data Data_2 are identical to each other, the comparator 171 may generate the attack non-detecting signal (ANDS). The comparator 171 may be implemented using, for example, an XOR operator or an XNOR operator, but the embodiments are not limited thereto. That is, the attack detecting circuit 170 according to some embodiments may determine whether the first nonvolatile memory 160_1 and the second nonvolatile memory 160_2 are attacked, using the first data Data_1 received from the first nonvolatile memory 160_1 and the second data Data_2 received from the second nonvolatile memory 160_2.

Referring again to FIG. 2, the attack detecting circuit 170 may generate one of the attack detecting signal (ADS) and the attack non-detecting signal (ANDS) and provide it to the nonvolatile memory controller 150. The nonvolatile memory controller 150 may output data or transfer an attack detecting alarm to the processor 120, on the basis of the signal received from the attack detecting circuit 170. The processor 120 may perform a data protection operation upon receiving the attack detecting alarm.

The memory device 100 according to some embodiments may be a memory device with enhanced security functions. For example, the memory device 100 may be a credit card in which the first nonvolatile memory 160_1 and the second nonvolatile memory 160_2 are implemented as a smart card in which the security function is very important. However, the embodiments are not limited thereto and the memory device 100 according to some embodiments may be used for a main server or the like in which the security function is determined to be important. A person having ordinary skill in the art of the present disclosure may implement the memory device 100 described in accordance with some embodiments to improve security functions in various fields and may achieve the object thereof.

Although the memory device 100 according to some embodiments is illustrated such that the host interface 110, the processor 120, the buffer memory 130, the address generator 140 and the nonvolatile memory controller 150 are interconnected to each other via a bus, this is only for exemplary description and the connection relationship between components is not limited to these examples. For example, it is a matter of course that the processor 120 and the address generator 140 may be directly connected or the attack detecting circuit 170 and the processor 120 may be directly connected. A person having ordinary skill in the art of the present disclosure may implement some embodiments of the present disclosure by changing the connection relationship as needed. Hereinafter, specific operations of the memory system and the memory device according to some embodiments will be described using FIGS. 7 to 12.

Figure 7:
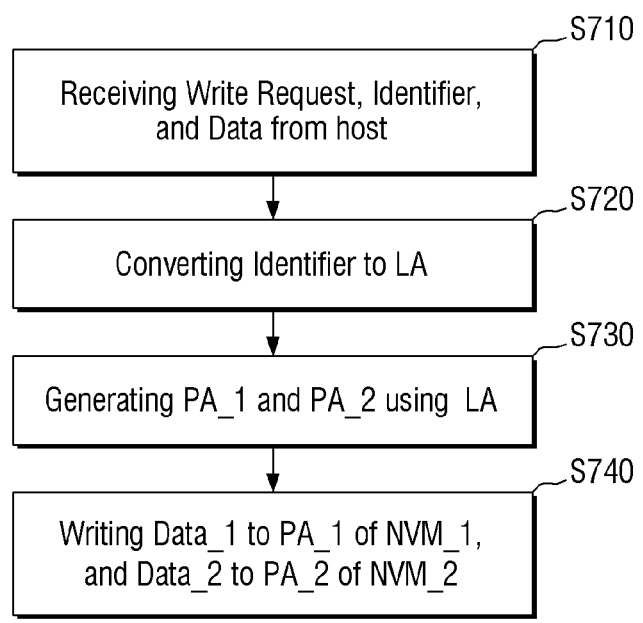
FIGS. 7 and 8 are exemplary diagrams illustrating write operations of the memory system and the memory device according to some embodiments.
Figure 8:
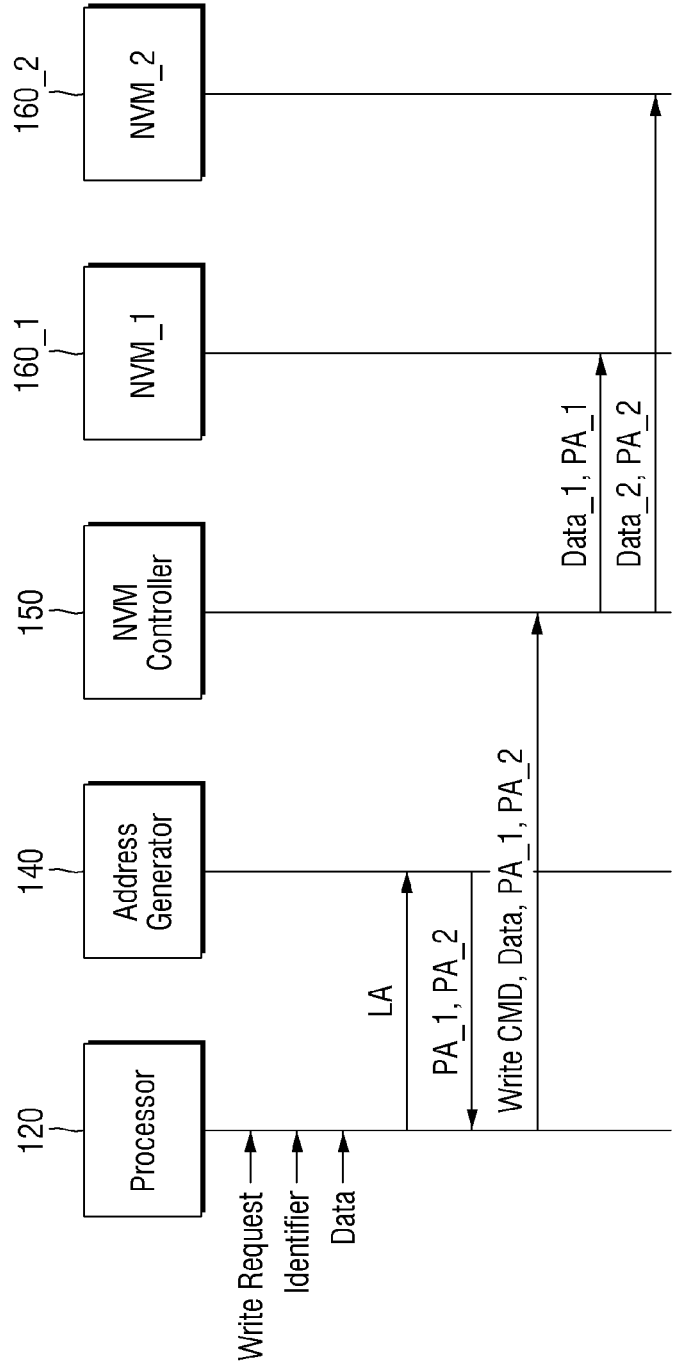
Figure 9:
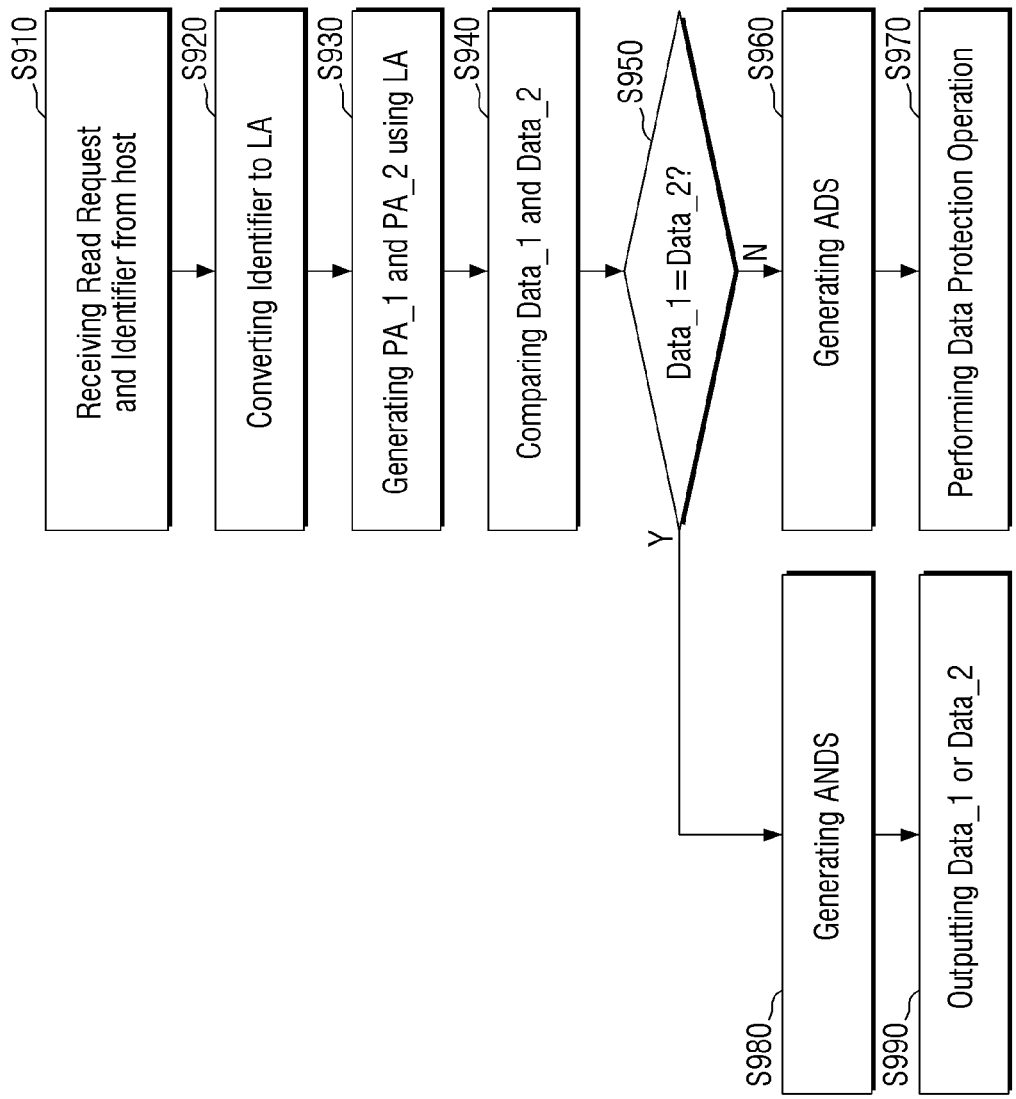
FIGS. 9 to 12 are exemplary diagrams for explaining a read operation of the memory system and the memory device according to some embodiments.
Figure 10:
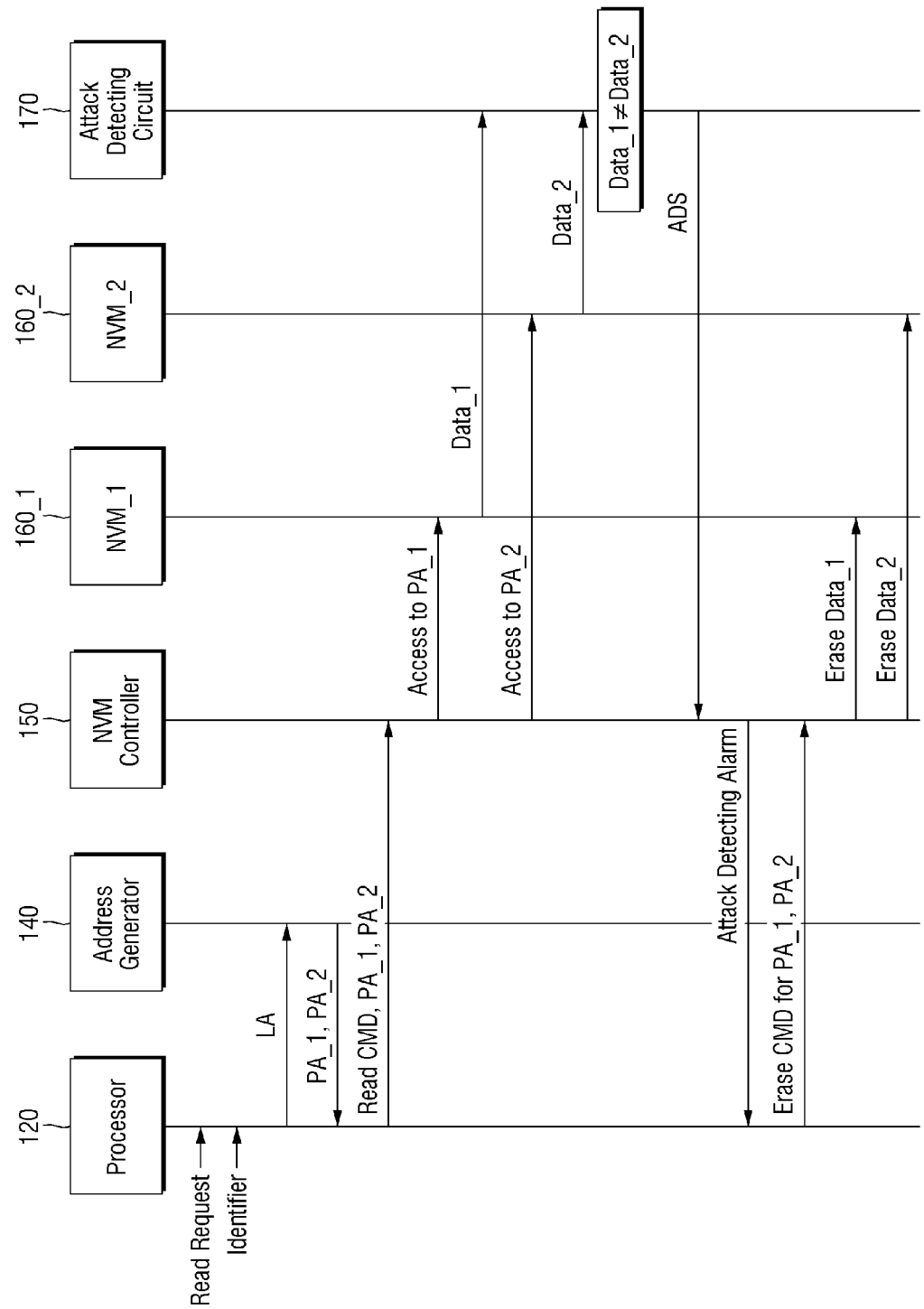
Figure 11:
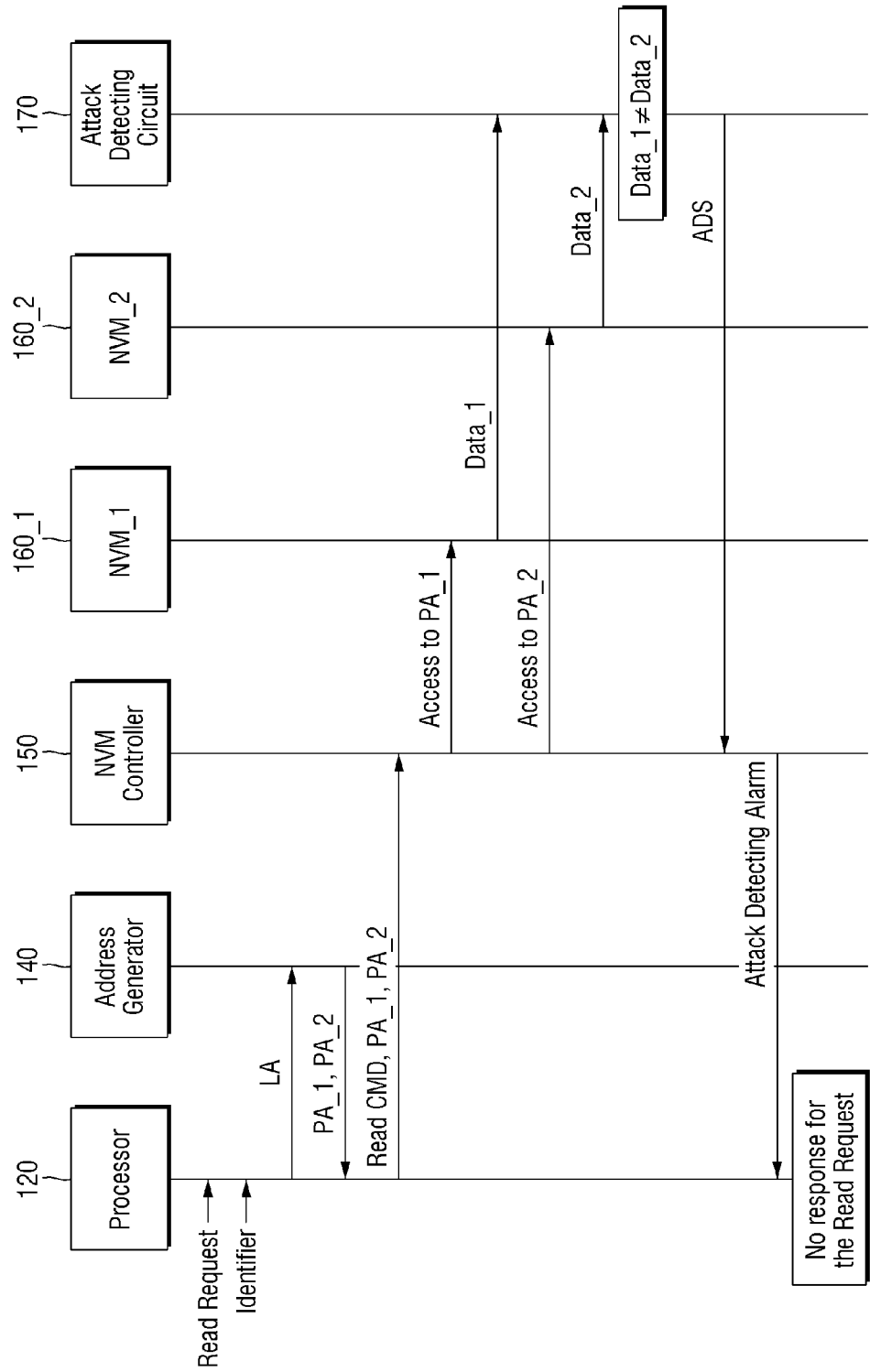
Figure 12:
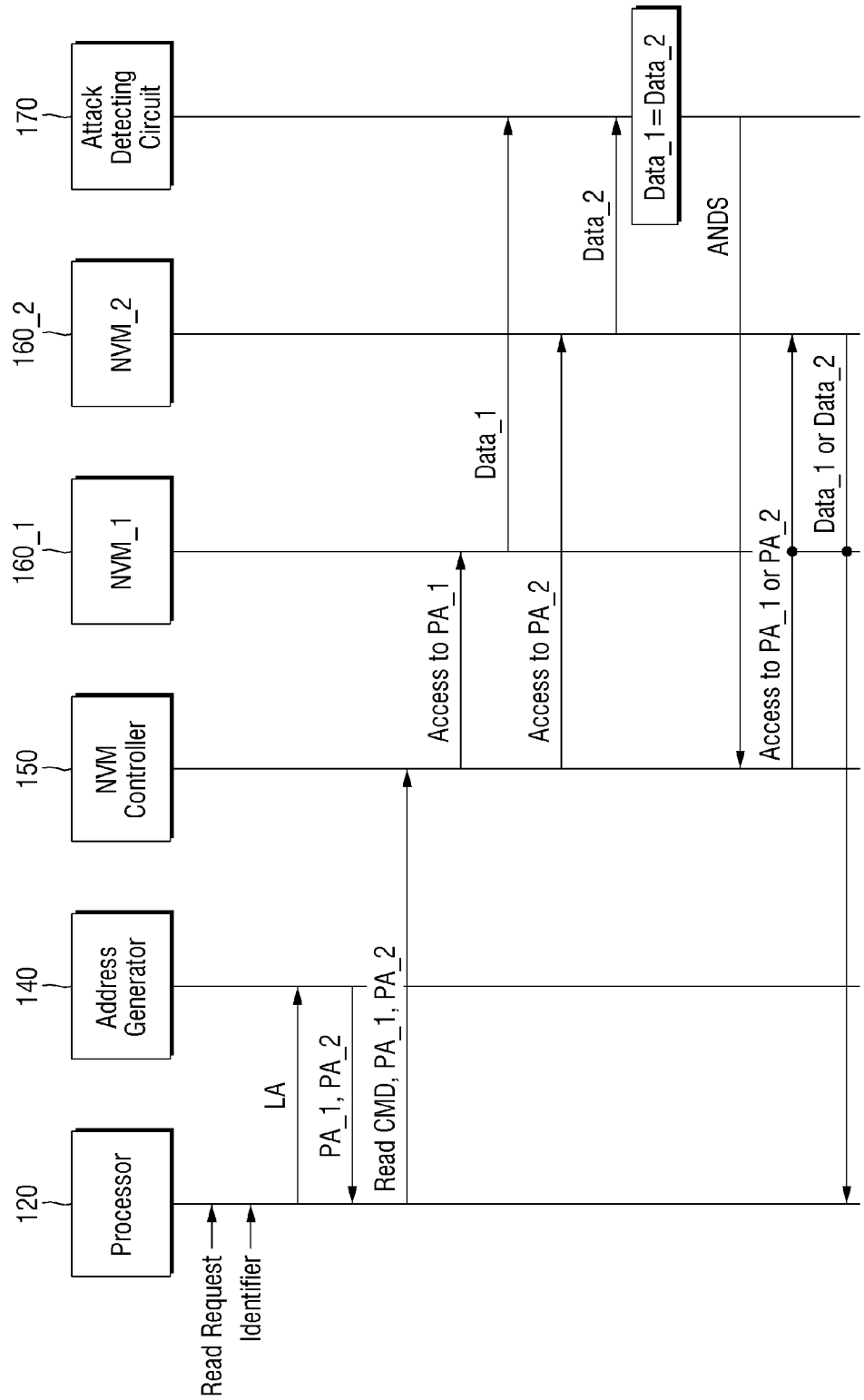

FIGS. 7 and 8 are exemplary diagrams illustrating the write operations of the memory system and the memory device according to some embodiments. For the convenience of description, the same or similar contents as the contents described above will be omitted or briefly described.

Referring to FIGS. 7 and 8, the processor 120 may receive a data write request, data to be written, and an identifier associated with the data to be written, from the host 200 (S710). As mentioned earlier, the identifier may or may not include a logical address.

The processor 120 may convert the received identifier into a first logical address LA (S720). For example, the identifier converting module 122 of the processor 120 may generate the first logical address LA on the basis of the identifier received from the host 200. The first logical address LA generated by the processor 120 may be provided to the address generator 140.

The address generator 140 may generate the first physical address PA_1 and the second physical address PA_2, using the received first logical address LA (S730).

For example, if the address generator 140 utilizes the first lookup table 141 and the second lookup table 142, the address generator 140 may generate a random number to generate the first physical address PA_1 and the second physical address PA_2. Subsequently, the address generator 140 may match the received first logical address LA with the generated first physical address PA_1 to generate a first lookup table 141. Similarly, the address generator 140 may match the received first logical address LA with the generated second physical address PA_2 to generate a second lookup table 142.

For example, if the address generator 140 utilizes the first physical address generation code PAC_1 and the second physical address generation code PAC_2, the address generator 140 may provide the first logical address LA and the first physical address generation code PAC_1 to the first address operator 143 to generate the first physical address PA_1. Similarly, the address generator 140 may provide the first logical address LA and the second physical address generation code PAC_2 to the second address operator 144 to generate the second physical address PA_2. As mentioned above, the first physical address PA_1 and the second physical address PA_2 have physically different locations.

According to some embodiments, the first physical address PA_1 and the second physical address PA_2 generated by the address generator 140 may be provided to the processor 120 again. However, the embodiments are not limited thereto. For example, the first physical address PA_1 and the second physical address PA_2 may not be provided to the processor 120 but may be provided to the nonvolatile memory controller 150.

The processor 120 may provide the data to be written, the first physical address PA_1 and the second physical address PA_2, together with the write command Write CMD, to the nonvolatile memory controller 150. The nonvolatile memory controller 150 may store the data to be written in the first physical address PA_1 of the first nonvolatile memory 160_1 as the first data Data_1. Further, the nonvolatile memory controller 150 may store the data to be written in the second physical address PA_2 of the second nonvolatile memory 160_2 as the second data Data_2 (S740).

According to some embodiments, since the data to be written may be stored as the first data Data_1 and the second data Data_2 in each of the first nonvolatile memory 160_1 and the second nonvolatile memory 160_2, in principle, the first data Data_1 and the second data Data_2 may be identical to each other. That is, in principle, the first data Data_1 stored in the first physical address PA_1 of the first nonvolatile memory 160_1 may be identical to the second data Data_2 stored in the second physical address PA_2 of the second nonvolatile memory 160_2. In other words, according to some embodiments, data of the same content may be stored in each of different physical addresses of the nonvolatile memory.

FIGS. 9 to 12 are exemplary diagrams for explaining the read operation of the memory system and the memory device according to some embodiments. For the convenience of description, the same or similar contents as the contents described above will be omitted or briefly described.

Referring to FIGS. 9 to 12, the processor 120 may receive a data read request and an identifier associated with the data to be read from the host 200 (S910).

The processor 120 may convert the received identifier into the first logical address LA (S920). For example, the identifier converting module 122 of the processor 120 may generate the first logical address LA on the basis of the identifier received from the host 200. The first logical address LA generated by the processor 120 may be provided to the address generator 140.

The address generator 140 may generate the first physical address PA_1 and the second physical address PA_2, using the received first logical address LA (S930).

For example, if the address generator 140 utilizes the first lookup table 141 and the second lookup table 142, the address generator 140 may generate the first physical address PA_1 and the second physical address PA_2 matched with the first logical address LA, by referring to the first lookup table 141 and the second lookup table 142.

For example, if the address generator 140 utilizes the first physical address generation code PAC_1 and the second physical address generation code PAC_2, the address generator 140 may generate the first logical address LA and the first physical address generation code PAC_1 to the first address operator 143 to generate the first physical address PA_1. Similarly, the address generator 140 may provide the first logical address LA and the second physical address generation code PAC_2 to the second address operator 144 to generate the second physical address PA_2. As mentioned above, the first physical address PA_1 and the second physical address PA_2 have locations physically different from each other.

According to some embodiments, the first physical address PA_1 and the second physical address PA_2 generated by the address generator 140 may be provided to the processor 120 again. However, the embodiments are not limited thereto and the first physical address PA_1 and the second physical address PA_2 may be directly provided to the nonvolatile memory controller 150 without passing through the processor 120.

The processor 120 may provide the first physical address PA_1 and the second physical address PA_2 together with the read command Read CMD to the nonvolatile memory controller 150. The nonvolatile memory controller 150 may access the first physical address PA_1 of the first nonvolatile memory 160_1 to read the first data Data_1. Similarly, the nonvolatile memory controller 150 may access the second physical address PA_2 of the second nonvolatile memory 160_2 to read the second data Data_2.

The read first data Data_1 and second data Data_2 may be provided to the attack detecting circuit 170. The attack detecting circuit 170 may compare the provided first data Data_1 with the provided second data Data_2 (S940).

If the first data Data_1 and the second data Data_2 provided by the attack detecting circuit 170 are different from each other (S950, N), the attack detecting circuit 170 may generate the attack detecting signal (ADS) (S960). The attack detecting circuit 170 may provide the generated attack detecting signal (ADS) to the nonvolatile memory controller 150. However, embodiments are not limited thereto, and for example, the attack detecting signal (ADS) may be directly provided to the processor 120. If the nonvolatile memory controller 150 receives the attack detecting signal (ADS), it may generate an attack detecting alarm and provide it to the processor 120. The processor 120 may perform a data protection operation (S970), upon receiving the attack detecting alarm. In other words, if the attack detecting signal (ADS) is generated in the attack detecting circuit 170, the processor 120 may perform the data protection operation (S970).

The data protection operation (S970) according to some embodiments may be an operation of preventing the first data Data_1 stored in the first nonvolatile memory 160_1 and the second data stored in the second nonvolatile memory 160_2 from leaking to outside. For example, the data protection operation (S970) may include deletion of the first data Data_1 stored in the first physical address PA_1 of the first nonvolatile memory 160_1 and deletion of the second data Data_2 stored in the second physical address PA_2 of the second nonvolatile memory 160_2. In another example, the data protection operation may include an operation in which the processor 120 does not respond to the data read request from the host 200.

If the first data Data_1 and the second data Data_2 provided by the attack detecting circuit 170 are equal to each other (S950, Y), the attack detecting circuit 170 may generate the attack non-detecting signal (ANDS) (S980). The generated attack non-detecting signal (ANDS) is provided to the nonvolatile memory controller 150, and the nonvolatile memory controller 150 may access one of the first physical address PA_1 of the first nonvolatile memory 160_1 and the second physical address PA_2 of the second nonvolatile memory 160_2 to output one of the first data Data_1 and the second data Data_2. In other words, if the attack detecting circuit 170 generates the attack non-detecting signal (ANDS), one of the first data Data_1 and the second data Data_2 may be provided to the processor 120 (S990).

When the attack non-detecting signal (ANDS) is generated, the nonvolatile memory controller 150 may determine which data of the first data Data_1 or the second data Data_2 is provided to the processor 120, depending on various situations and policies. For example, if the first nonvolatile memory 160_1 has a faster response speed than the second nonvolatile memory 160_2, the nonvolatile memory controller 150 may provide the first data Data_1 to the processor 120, when receiving the attack non-detecting signal (ANDS). In another example, if the first nonvolatile memory 160_1 is a single-level cell region of flash memory and the second nonvolatile memory 160_2 is a multi-level cell region of flash memory, the nonvolatile memory controller 150 may provide the first data Data_1 to the processor 120, when receiving the attack non-detecting signal (ANDS). However, these descriptions are merely illustrative and the embodiments are not limited thereto.

An attacker may apply a physical attack to the first nonvolatile memory 160_1 and/or the second nonvolatile memory 160_2 to obtain desired data or change program code. For example, the attacker may irradiate the first nonvolatile memory 160_1 and/or the second nonvolatile memory 160_2 with a laser beam. When the physical attack is applied to the first nonvolatile memory 160_1 and/or the second nonvolatile memory 160_2, the first data Data_1 and/or the second data Data_2 stored in the first nonvolatile memory 160_1 and/or the second nonvolatile memory 160_2 may be partially changed. For example, when the first data Data_1 is an "encrypted password", the first data Data_1 may be changed to a "non-encrypted password" by the physical attack on the first nonvolatile memory 160_1. In another example, in the case where the first data Data_1 is a program code that "blocks connection when an external connection is found", the first data Data_1 may be changed to a program code that "provides data if an external connection is found" by the physical attack of the first nonvolatile memory 160_1.

According to some embodiments, the same data (e.g., the data to be written described above) is stored in each of the first physical address PA_1 of the first nonvolatile memory 160_1 and the second physical address PA_2 of the second nonvolatile memory 160_2. Therefore, even if an attacker attacks the first nonvolatile memory 160_1 to obtain desired data or change the program code, the attack may not be applied to the second nonvolatile memory 160_2. Therefore, even if the first data Data_1 is changed due to the attack of the attacker, since the second data Data_2 is not changed and the attack detecting signal (ADS) is generated, a data leakage or a change in program code may be prevented.

A case where the attacker simultaneously attacks the first nonvolatile memory 160_1 and the second nonvolatile memory 160_2 will be assumed. According to some embodiments, since the first physical address PA_1 and the second physical address PA_2 are different from each other, only one of the first data Data_1 and the second data Data_2 may be affected by the attack. Eventually, because only one of the first data Data_1 and the second data Data_2 is changed (that is, the processor 120 performs the data protection operations), the attacker may not obtain desired data or change the program code.

There may be a case where both the first data Data_1 and the second data Data_2 are affected by the attack, depending on the type of attack (for example, depending on the magnitude of the laser beam). However, even in this case, since the first physical address PA_1 and the second physical address PA_2 are different from each other, each of the first data Data_1 and the second data Data_2 may be differently affected by the attack. For example, the first data Data_1 may be completely changed by the attack, and the second data Data_2 may be only partially changed by the attack. Therefore, even when both the first data Data_1 and the second data Data_2 are changed, since the first data Data_1 and the second data Data_2 are different from each other, the attack detecting signal (ADS) is generated and eventually the attacker may not obtain the desire data or change the program code. That is, even if an attacker simultaneously attacks the first nonvolatile memory 160_1 and the second nonvolatile memory 160_2, it is still possible to prevent the leakage of data and the change of the program code.

Figure 13:
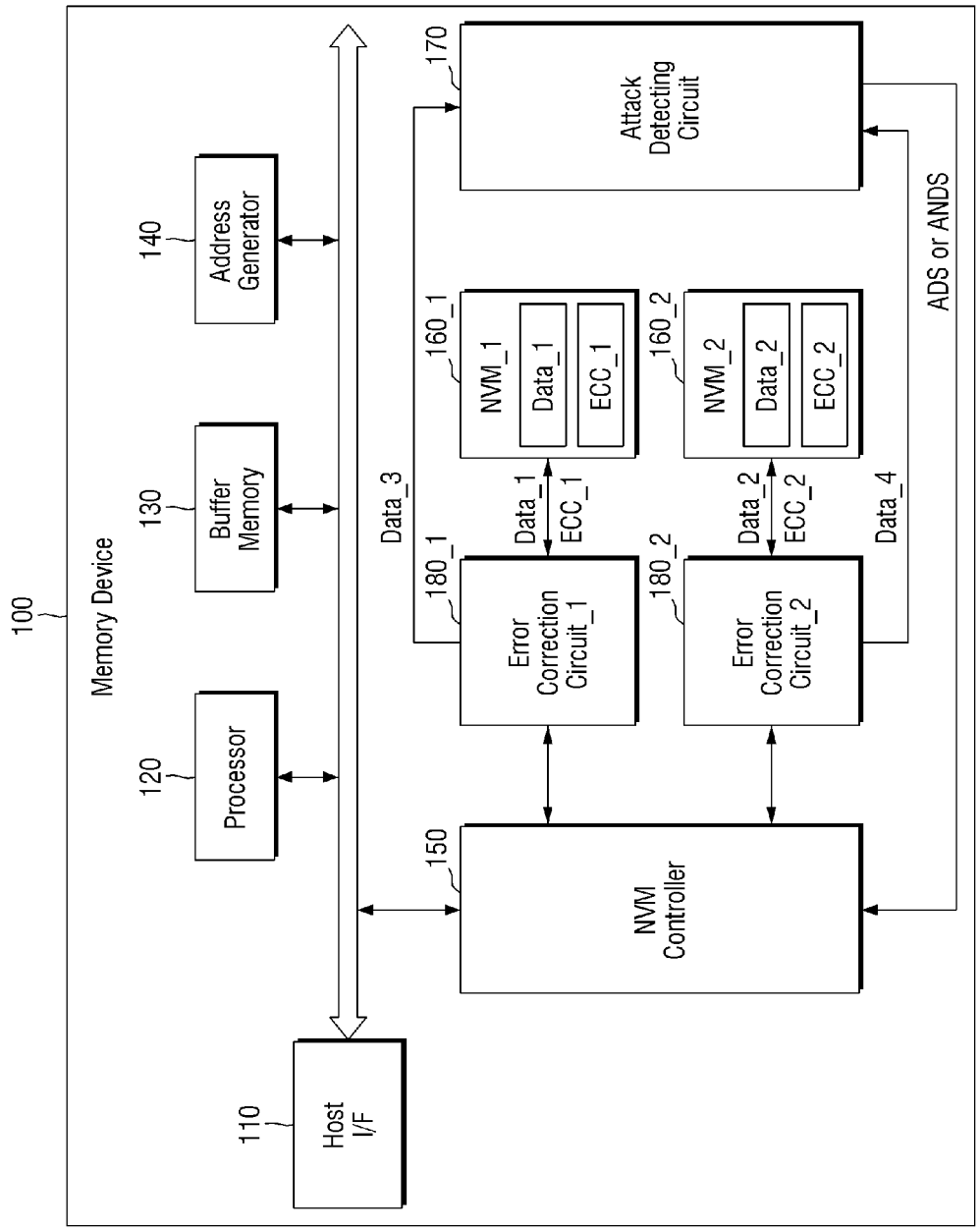
FIG. 13 is an exemplary diagram for explaining the memory device according to some embodiments.
Figure 14:
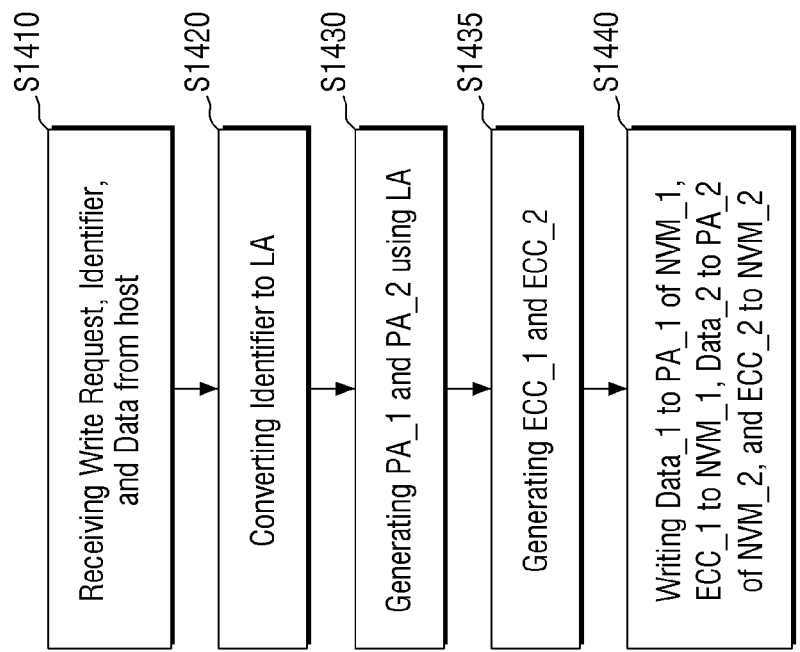
FIG. 14 is an exemplary diagram for explaining a write operation of the memory system and the memory device according to some embodiments.
Figure 15:
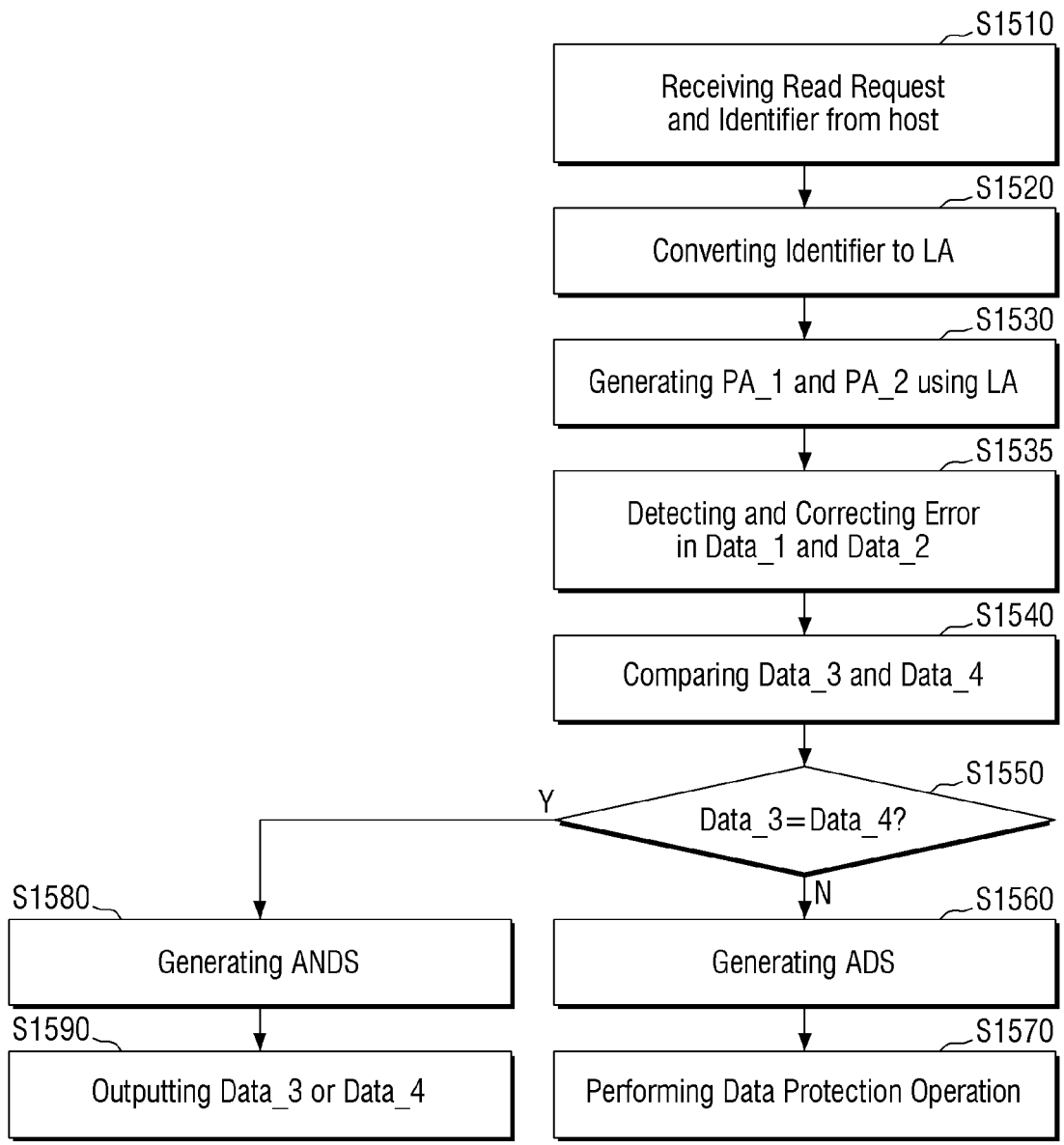
FIG. 15 is an exemplary diagram for explaining a read operation of the memory system and the memory device according to some embodiments.

FIG. 13 is an exemplary diagram for explaining the memory device according to some embodiments. FIG. 14 is an exemplary diagram for explaining the write operation of the memory system and the memory device according to some embodiments. FIG. 15 is an exemplary diagram for explaining the read operation of the memory system and the memory device according to some embodiments. For the convenience of description, similar or repeated contents of the contents described above will be omitted or briefly described.

Referring to FIGS. 1 and 13, the memory device 100 according to some embodiments may include a host interface 110, a processor 120, a buffer memory 130, an address generator 140, a nonvolatile memory controller 150, a first nonvolatile memory 160_1, a second nonvolatile memory 160_2, an attack detecting circuit 170, a first error correction circuit 180_1 and a second error correction circuit 180_2.

The first error correction circuit 180_1 may be connected to the first nonvolatile memory 160_1, and the second error correction circuit 180_2 may be connected to the second nonvolatile memory 160_2. Even though the first error correction circuit 180_1 and the second error correction circuit 180_2 are illustrated as being separated from the nonvolatile memory controller 150 in the drawing, the embodiments are not limited thereto. For example, the first error correction circuit 180_1 and the second error correction circuit 180_2 may be included in the nonvolatile memory controller 150. Also, even though the first error correction circuit 180_1 and the second error correction circuit 180_2 are illustrated as being constituent elements separated from each other in the drawings, embodiments are not limited thereto. For example, the first error correction circuit 180_1 and the second error correction circuit 180_2 may be implemented as a single error correction circuit.

The first error correction circuit 180_1 may be used to detect whether there is an error in the data stored in the first nonvolatile memory 160_1. In addition, when storing the data in the first nonvolatile memory 160_1 (that is, when writing the data), the first error correction circuit 180_1 may generate a first error correction code ECC_1 for an error detection. Similarly, the second error correction circuit 180_2 may be used to detect whether there is an error in the data stored in the second nonvolatile memory 160_2. Also, the second error correction circuit 180_2 may generate a second error correction code ECC_2 for error detection when storing data in the second nonvolatile memory 160_2. For example, the first error correction code ECC_1 and the second error correction code ECC_2 may be parity bits, Hamming codes, and the like, but the embodiments are not limited thereto.

The first nonvolatile memory 160_1 may store the first data Data_1 and the first error correction code ECC_1 generated from the first error correction circuit 180_1. In some embodiments, although the region in which the first data Data_1 is stored may be different from the region in which the first error correction code ECC_1 is stored, the embodiments are not limited thereto. Similarly, the second nonvolatile memory 160_2 may store the second data Data_2 and the second error correction code ECC_2 generated from the second error correction circuit 180_2.

Referring to FIGS. 1, 13 and 14, the processor 120 may receive data to be written and an identifier associated with the data to be written, together with the data write request, from the host 200 (S1410).

The processor 120 may generate the first logical address LA from the received identifier (S1420).

The generated first logical address LA is provided to the address generator 140, and the address generator 140 may generate the first physical address PA_1 and the second physical address PA_2, using the first logical address LA (S1430).

The first physical address PA_1 and the second physical address PA_2 are again provided to the processor 120, and the processor 120 may provide the data to be written, the first physical address PA_1 and the second physical address PA_2, together with the data write command, to the nonvolatile memory controller 150.

The data to be written is provided to the first error correction circuit 180_1 and the second error correction circuit 180_2, and the first error correction circuit 180_1 and the second error correction circuit 180_2 may generate the first error correction code ECC_1 and the second error correction code ECC_2, using the data to be written, respectively (S1435). According to some embodiments, the first error correction code ECC_1 and the second error correction code ECC_2 may be identical to each other.

The nonvolatile memory controller 150 stores the data to be written in the first physical address PA_1 of the first nonvolatile memory 160_1 as the first data Data_1 and may store the generated first error correction code ECC_1 in a specific region of the first nonvolatile memory 160_1. In addition, the nonvolatile memory controller 150 stores the data to be written in the second physical address PA_2 of the second nonvolatile memory 160_2 as the second data Data_2 and may store the generated second error correction code ECC_2 in a specific region of the second nonvolatile memory 160_2 (S1440).

Referring to FIGS. 1, 13 and 15 again, the processor 120 receives an identifier associated with data to be read, together with a data read request, from the host 200 (S1510).

The processor 120 converts the received identifier into the first logical address LA (S1520), the first logical address LA is provided to the address generator 140, and the first physical address PA_1 and the second physical address PA_2 may be generated (S1530).

The first physical address PA_1 and the second physical address PA_2 may be provided to the processor 120. The processor 120 may provide the first physical address PA_1 and the second physical address PA_2, together with the read command, to the nonvolatile memory controller 150. The nonvolatile memory controller 150 reads the first data Data_1 stored in the first physical address PA_1 of the first nonvolatile memory 160_1 and may provide it to the first error correction circuit 180_1. Further, the nonvolatile memory controller 150 also reads the first error correction code ECC_1 from the first nonvolatile memory 160_1 and may provide it to the first error correction circuit 180_1. Similarly, the nonvolatile memory controller 150 reads the second data Data_2 stored in the second physical address PA_2 of the second nonvolatile memory 160_2 and may provide it to the second error correction circuit 180_2. Further, the nonvolatile memory controller 150 also reads the second error correction code ECC_2 from the second nonvolatile memory 160_2 and may provide it to the second error correction circuit 180_2.

The first error correction circuit 180_1 may detect and correct an error of the first data Data_1, using the first error correction code ECC_1 and the first data Data_1. Similarly, the second error correction circuit 180_2 may detect and correct an error of the second data Data_2, using the second error correction code ECC_2 and the second data Data_2 (S1535). For the convenience of description, the error-corrected first data Data_1 and the error-corrected second data Data_2 are defined as third data Data_3 and fourth data Data_4, respectively. The third data Data_3 and the fourth data Data_4 may be provided to the attack detecting circuit 170. The attack detecting circuit 170 may receive the third data Data_3 and the fourth data Data_4 and may compare them (S1540).

If the third data Data_3 and the fourth data Data_4 are different from each other (S1550, N), the attack detecting circuit 170 generates the attack detecting signal (ADS) (S1560) and may provide it to the nonvolatile memory controller 150. The nonvolatile memory controller 150 may provide an attack detecting alarm to the processor 120 upon receiving the attack detecting signal (ADS). The processor 120 may perform the data protection operation upon receiving the attack detecting alarm (S1570). In other words, the processor 120 may perform the data protection operation when the attack detecting signal (ADS) is generated.

If the third data Data_3 and the fourth data Data_4 are identical to each other (S1550, Y), the attack detecting circuit 170 generates the attack non-detecting signal ANDS (S1580) and may provide it to the nonvolatile memory controller 150. The nonvolatile memory controller 150 may provide one of the third data Data_3 and the fourth data Data_4 to the processor 120 upon receiving the attack non-detecting signal (ANDS) (S1590). The processor 120 receives one of the third data Data_3 and the fourth data Data_4 and provides it to the host 200, thereby responding to the data read request from the host 200. In other words, when the attack non-detecting signal (ANDS) is generated, the processor 120 may provide one of the third data Data_3 and the fourth data Data_4 to the outside.

According to some embodiments, even if the first data Data_1 and/or the second data Data_2 is changed by the attacker, the data may be recovered to original data through the first error correction circuit 180_1 and the second error correction circuit 180_2. If the data is recovered, ultimately, the attacker may not receive the desired data. There may be a case where the first error correction circuit 180_1 and the second error correction circuit 180_2 may not recover data. However, in this case, since the first data Data_1 and the second data Data_2 are different from each other as described above, and the data protection operation is performed by the processor 120, it is possible to prevent a data leakage and a change in program code.

According to some embodiments, if the first data Data_1 stored in the first nonvolatile memory 160_1 and the second data Data_2 stored in the second nonvolatile memory 160_2 are different from each other, the processor 120 may perform the data protection operation. However, depending on the situation, there may be a case where the first data Data_1 and/or the second data Data_2 are changed for reasons other than the attack of the attacker. Even in such a case, the processor 120 may perform the data protection operation, but this may not be an intended operation. Therefore, the memory device 100 according to some embodiments further includes the first error correction circuit 180_1 and the second error correction circuit 180_2, thereby effectively preventing an attacker's attack and preventing unintended data protection operations from being performed.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A memory device comprising:
an address generator which generates a first physical address and a second physical address different from the first physical address;
a first nonvolatile memory including the first physical address;
a second nonvolatile memory including the second physical address;
an attack detecting circuit which detects whether the first nonvolatile memory and the second nonvolatile memory are attacked, wherein the attack detecting circuit:
receives first data from the first nonvolatile memory,
receives second data from the second nonvolatile memory,
compares the first data and the second data with each other,
determines whether the first nonvolatile memory and the second nonvolatile memory are attacked based on a comparison result of the first data and the second data, and
generates an attack detecting signal in response to determining the first data and the second data are different from each other; and
a processor that performs a data protection operation comprising withholding a response to an external data read request in response to the generation of the attack detecting signal.

2. The memory device of claim 1, wherein:
when the first data and the second data are different from each other, the attack detecting circuit determines that there is an attack on the first nonvolatile memory and the second nonvolatile memory, and
when the first data and the second data are identical to each other, the attack detecting circuit determines that there is no attack on the first nonvolatile memory and the second nonvolatile memory.

3. The memory device of claim 1, wherein the data protection operation includes deletion of data stored at the first physical address and data stored at the second physical address.

4. The memory device of claim 1, wherein:
the processor receives a first identifier and the external data read request for the first identifier, and
the processor converts the first identifier into a first logical address and provides the first logical address to the address generator.

5. The memory device of claim 4, wherein:
the address generator operates the first logical address and a first physical address generation code to generate the first physical address, and
the address generator operates the first logical address and a second physical address generation code to generate the second physical address.

6. The memory device of claim 4, wherein:
the address generator generates the first physical address, using the first logical address and a first lookup table, and
the address generator generates the second physical address, using the first logical address and a second lookup table.

7. The memory device of claim 1, wherein:
the processor receives the external data read request,
the attack detecting circuit generates an attack non-detecting signal, when the first data and the second data are identical to each other, and
the processor outputs one of the first data and the second data when the attack non-detecting signal is generated.

8. The memory device of claim 7, wherein:
the first nonvolatile memory is a single level cell (SLC) region of a flash memory,
the second nonvolatile memory is a multi-level cell (MLC) region of a flash memory, and
the processor outputs the first data, when the attack non-detecting signal is generated.

9. The memory device of claim 1, further comprising:
a first error correction circuit connected to the first nonvolatile memory; and
a second error correction circuit connected to the second nonvolatile memory, wherein:
the first nonvolatile memory and the second nonvolatile memory include a first error correction code and a second error correction code, respectively,
the first error correction circuit generates the first data, using data stored in the first physical address and the first error correction code, and
the second error correction circuit generates the second data, using data stored in the second physical address and the second error correction code.

10. The memory device of claim 1, wherein:
the processor receives a second identifier, third data associated with the second identifier, and a write request for the third data, wherein:
the address generator generates a third physical address, and a fourth physical address different from the third physical address, from the second identifier, and
in response to write request for the third data:
the processor stores the third data at the third physical address of the first nonvolatile memory, and
the processor stores the third data at the fourth physical address of the second nonvolatile memory.

11. A memory device comprising:
a first nonvolatile memory which stores first data at a first physical address corresponding to a first identifier;
a second nonvolatile memory in which second data different from the first data is stored at a second physical address corresponding to the first identifier and different from the first physical address;
an attack detecting circuit which detects whether the first nonvolatile memory and the second nonvolatile memory are attacked; and
a processor which receives a read request of data corresponding to the first identifier, wherein:
in response to the read request:
the processor accesses the first physical address of the first nonvolatile memory to read third data associated with the first data,
the processor accesses the second physical address of the second nonvolatile memory to read fourth data associated with the second data, and
the attack detecting circuit receives the third and fourth data and generates an attack detecting signal in response to determining the third data and the fourth data are different from each other; and
the processor that performs a data protection operation comprising withholding a response to the read request in response to the generation of the attack detecting signal.

12. The memory device of claim 11, wherein in response to the read request:

the first nonvolatile memory provides the first data to the attack detecting circuit as the third data, and the second nonvolatile memory provides the first data to the attack detecting circuit as the fourth data, the attack detecting circuit generates an attack detecting signal, and the processor performs a data protection operation of the first nonvolatile memory and the second nonvolatile memory, when the attack detecting signal is generated.

\* \* \* \* \*